United States Patent
Grohs et al.

(10) Patent No.: US 6,594,385 B2
(45) Date of Patent: *Jul. 15, 2003

(54) IMAGE COMPRESSION OF BACKGROUND AND TEXT TILES

(75) Inventors: Randall E. Grohs, Eagle, ID (US); Brent M. Bradburn, Boise, ID (US)

(73) Assignee: Hewlett-Packard Development Company, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,031

(22) Filed: Oct. 27, 1998

(65) Prior Publication Data

US 2001/0041003 A1 Nov. 15, 2001

(51) Int. Cl.[7] .............................. G06K 9/00; G06K 9/36
(52) U.S. Cl. ...................................... 382/166; 358/1.15
(58) Field of Search ................................ 382/166, 232, 382/234, 237, 243, 248, 250, 251, 303; 348/391.1, 393.1, 395.1, 403.1, 405.1, 420.1; 358/1.15, 482, 483, 464, 467, 539; 341/54; 375/240.03, 240.18, 240.2, 240.24

(56) References Cited

U.S. PATENT DOCUMENTS

| | | | | |
|---|---|---|---|---|
| 4,366,505 A | * | 12/1982 | Tsuda et al. ................. | 358/426 |
| 5,014,198 A | * | 5/1991 | Umemura .................... | 382/232 |
| 5,552,898 A | * | 9/1996 | Deschuytere ................ | 382/237 |
| 5,661,570 A | | 8/1997 | Nomura ....................... | 358/456 |
| 5,673,370 A | * | 9/1997 | Laney ......................... | 358/539 |
| 5,706,368 A | * | 1/1998 | Mita ........................... | 382/284 |
| 5,742,704 A | * | 4/1998 | Suzuki et al. ................ | 382/232 |
| 5,754,746 A | * | 5/1998 | Blurfrushan et al. ........ | 358/1.15 |
| 5,777,749 A | * | 7/1998 | Noda et al. .................. | 382/239 |
| 5,778,092 A | * | 7/1998 | MacLeod et al. ............ | 382/176 |
| 5,861,960 A | | 1/1999 | Suzuki et al. ................ | 358/432 |
| 6,069,980 A | * | 5/2000 | Honda ......................... | 382/250 |

FOREIGN PATENT DOCUMENTS

EP          0902398 A2     3/1999              G06T/9/00

* cited by examiner

*Primary Examiner*—Timothy M. Johnson
(74) *Attorney, Agent, or Firm*—Matthew L. Wade

(57) ABSTRACT

A compression apparatus for compressing a digital image is disclosed and includes a decomposer, a transform encoder unit and a merge plane compressor. The digital image is converted by the compression apparatus into a set of tiles suitable for transform encoding. Each tile from the set is then compressed by converting the tile into a "merge plane data string" and an associated "transform encoded data string". The merge plane data string describes only the spatial locations of the background pixels in the tile. The transform encoded data describes the tile in the frequency domain but without the spatial frequencies associated with the background pixels. One important use of the present invention is to compress digital images prior to transmitting the digital image to a printer for printing.

14 Claims, 5 Drawing Sheets

IMAGE COMPRESSION OF BACKGROUND AND TEXT TILES

CROSS REFERENCE TO RELATED APPLICATIONS

This application includes subject matter related to co-pending application entitled: "System For Compression Of Digital Images Comprising Low Detail Areas", having U.S. Pat. No. 6,130,630, and the co-pending patent application entitled: "Apparatus And Method For Compressing Huffman Encoded Data", having U.S. Ser. No. 09/179,925, each of which are incorporated by reference herein, assigned to the same assignee as this application, and filed on even date herewith.

FIELD OF THE INVENTION

This invention relates to the compression of digital images, and more particularly to the compression of a digital image comprising a background.

BACKGROUND OF THE INVENTION

A digital image is typically displayed or printed in the form of a rectangular array of "picture elements" or "print elements". For purposes of this application, both "picture elements" and "print elements" are referred to herein as "pixels". Digital images are typically represented in a computer by one or more arrays of binary numbers. For example, a monochrome digital image can be represented in a computer by a single array of binary numbers. Each binary number in the array defines a gray-level value for an associated pixel. The position of the binary number in the array describes the spatial location of the pixel.

A color digital image can be represented in a computer by three arrays of binary numbers. Each array (alternatively referred to herein as an "image plane") representing an axis of a suitable color coordinate system in accordance with the well known trichromatic theory. The color of a pixel in the digital image is defined by an associated binary number (defining one of three color components from the color coordinate system) from each array. It is noted that there are many color coordinate systems that can be used to represent the color of a pixel. These color coordinate systems include a "Red-Green-Blue" (RGB) coordinate system and a cyan-magenta-yellow (CMY) coordinate system. The former is commonly used in monitor display applications, the latter is commonly used in printing applications. For purposes of this application, each binary number representing a pixel is referred to herein as a "pixel component" or alternatively as a "pixel component value". In addition, the phrase "pixel value" refers to the value of the number or numbers defining the pixel. It is noted that a pixel value can be defined with reference to the color of the pixel. Thus, a pixel can be said to have a value corresponding to the color or gray-scale level of white. This indicates that the binary number or numbers associated with the pixel has a total value that define the pixel as white.

The amount of data used to represent a digital image can be extremely large. Consider, for example, a color digital image consisting of 1024×1024 pixels. If the pixels are represented in the computer by three image planes of 8-bit numbers, the digital image would occupy over 1 megabyte of storage space.

The large amount of data required to represent a digital image in a computer can result in significant costs that are associated both with increased storage capacity requirements, and the computing resources and time required to transmit the data to another computing device. In order to reduce these costs, digital image compression techniques have been and are continuing to be developed.

Digital image compression techniques can generally be divided into two classes: lossless and lossy. In lossless compression, the digital image reconstructed after compression is identical, pixel by pixel, to the original image. A common lossless compression technique is the well known Lempel-Ziv-Welch (LZW) compression scheme. See, for example, U.S. Pat. No. 5,479,587. That Patent is incorporated herein by reference. Another lossless compression technique is described by the "Joint Bi-level Image Experts Group Compression standard" (JBIG).

In lossy compression, the reconstructed digital image may be somewhat degraded with respect to the original digital image in order to attain higher compression ratios than those of lossless procedures. One popular lossy compression scheme is referred to as "transform coding". See Baxes, G. A., *Digital image Processing, Principles and Applications*, pp 198–211, ISBN 0-471-00949-0 (1994). Those pages are incorporated herein by reference.

In general, transform encoding is accomplished by decomposing each image plane of a digital image into a set of two-dimensional blocks of pixel component values that define a sub-array of pixels. These blocks are typically small, such as 4×4 or 8×8 blocks of component values. Each block is then transformed into the frequency domain by use of a frequency transform. This reduces the block into a series of basis functions. It is noted that typically the first basis function is a constant scalar value. This is sometimes referred to as the "DC" component or alternatively as the "DC coefficient" for the transform. While in the frequency domain, the amount of data required to represent the block can be reduced by quantization. This is often accomplished by using criteria based on the visibility of each basis functions. After quantization, the amount of data representing the block can be even further reduced by using an entropy encoding (e.g., Huffman coding) technique.

A number of transform coding schemes have been developed. One widely used transform coding scheme has been standardized by the published and generally available works of the Joint Photographic Experts Group (JPEG). See generally, Pennebaker, W. B., and Mitchell, J. L., *JPEG: Still Image Compression Standard*, ISBN 0-442-01272-1 (1993). The JPEG compression standard in lossy mode makes use of the Discrete Cosine Transform (DCT). Like many transform coding schemes, the JPEG compression scheme is adjustable. That is to say that the number of frequency components discarded during quantization can be varied to produce variable compression ratios. Unfortunately, however, as the level of quantization increases to achieve higher compression ratios, image quality can be degraded significantly.

As just discussed, digital image compression techniques can be used to reduce the amount of data required to represent a digital image in a computer. These techniques can reduce the computing costs associated with storing and transmitting digital images. There are, however, significant costs that can be incurred in using these compression techniques. For example, there can be substantial system overhead and time required to perform the compression and decompression operations. In addition, there is a trade off between the use of lossy compression techniques and lossless compression techniques. In general, lossy compression can be used to achieve high compression ratios. Image quality, however, can be significantly degraded. Lossless compression, on the other hand, does not degrade image quality but usually results in relatively low compression ratios.

SUMMARY OF THE INVENTION

An apparatus for compressing a digital image comprising pixels having a first value and comprising a means for decomposing said digital image into a set of tiles; and a means for compressing each tile from said set of tiles, wherein said compressing means responsive to a binary tile from said set of tiles, said binary tile comprising pixels having a background value and pixels having one other value, to generate a first and an associated second set of data, said first set of data comprising spatial location information for substantially all pixels in said binary tile having said background value and said second set of data comprising data representative of a compressed second tile, each pixel in said second tile having said one other value.

DETAILED DESCRIPTION OF THE INVENTION

Figure 1:
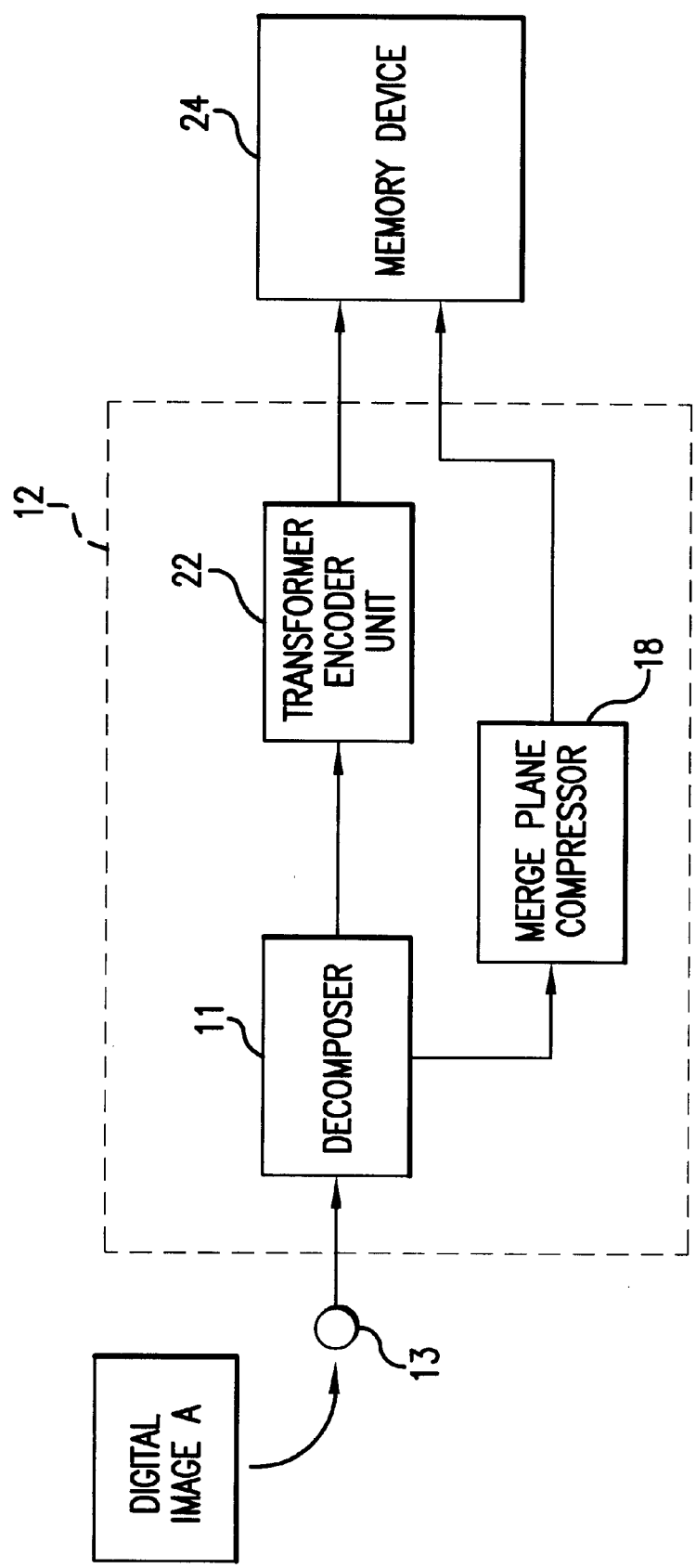
FIG. 1 is a high level diagram of Compression Apparatus that is in accordance with the principles of the present invention.

For purposes of this discussion, a sub-array of pixels in a digital image, in general, is referred to herein as a "tile". A single color (or single gray-scale) tile is referred to herein as a "monotone tile". A two color (or two gray-scale level) tile is referred to herein as a "binary tile". The blocks of pixel component values that make up a monotone tile are referred to herein as monotone blocks. The blocks of pixel component values that make up a binary tile are referred to herein as binary blocks.

Color digital images often contain a significant number of areas that consist of pixels that are all the same color or at most two colors. Similarly, many monochrome digital images contain areas of pixels that are of the same gray-scale level or at most two gray-scale levels. To illustrate this, consider a 24-bit color digital image (i.e., three 8-bit binary numbers, one from each of three image planes, are used to define each pixel in the image) generated from a word processing application. Typically, these digital images (as displayed) contain text of a uniform color set against a uniform colored background. Assuming that the text is black and the background color is white, it can be seen that this digital image will likely have a significant number of areas that are all white (corresponding to the background) as well as areas that are white and black (corresponding to the text set against the white background).

Now consider the compression of this digital image using a transform coding technique As previously indicated, transform encoding is accomplished by decomposing each image plane of a digital image into a set of two-dimensional blocks of pixel component values. These blocks are typically small and define tiles in the digital image that are also, therefore, small. For example, the JPEG standard specifies 8×8 blocks of pixel component values. Thus, the tiles that the blocks define consist of 8×8 pixels. It can be seen that for the digital image described above, there will likely be many blocks associated with tiles that fall completely into the white background areas. These tiles are monotone tiles comprised of pixels that are white. In addition, there will likely be many blocks associated with tiles that include a portion of the black text and a portion of the background area. These tiles will typically be binary tiles comprised of pixels that are white and black.

As will be discussed in the following exemplary embodiments, the present invention can be used to significantly simplify the transform encoding of digital images, such as the 24-bit color digital image just described, by making use of a second set of data. The second set of data is used (during decompression) to reconstruct pixels that have the background color (or gray-scale level) and that exist in a binary tile or a monotone tile. For purposes of this discussion, these pixels are referred to herein as "background pixels", and the data used to reconstruct the background pixels during decompression is referred to, in general, as "background pixel data".

It should be understood that the background pixel data can take many forms and the present invention is not limited to any one these forms. For example, background pixel data could be data that indicates the spatial location of each background pixel along with a single code word for indicating the color (or gray-scale level) of the background pixels in the image. Or, alternatively, the background pixel data can just represent the spatial location of each background pixel. During decompression, the color of each background pixel is given an assumed color (or grayscale level). For example, the assumed color (or gray scale level) could be white. For purposes of this application, data that represents the spatial location of background pixels in a digital image is referred to herein as a "merge plane".

To illustrate the use of background pixel data to simplify (and improve) transform coding procedures, FIG. 1 provides a high level diagram of a first exemplary embodiment of the present invention in the form of Compression Apparatus 12. As will be clear to a person skilled in the art, Compression Apparatus 12 can be incorporated into a number of computing devices in order to provide improved data compression capability. These computing devices include, but are not limited to, personal computers, scanners, printers and facsimile devices.

As will be discussed in detail below, Compression Apparatus 12 operates to convert a received digital image into a set of tiles and to then convert the digital image, tile by tile, into background pixel data and transform encoded data. The background pixel data is compressed and both sets of data are stored into one or more memory devices, such as Memory Device 24. In this embodiment, the background pixel data that is generated by Compression Apparatus 12 is a compressed merge plane. As previously indicated, a merge plane is data that indicates the spatial location of each background pixel in a digital image.

Before discussing in detail the operation of Compression Apparatus 12, it is important to understand how the merge plane and transform encoded data is used to reconstruct (during decompression) the original digital image. As just indicated, Compression Apparatus 12 generates a merge plane and transform encoded data for a received digital image tile by tile. For each tile in the digital image, this is accomplished by generating an associated "merge plane data string" and an "associated transform encoded data string". In this embodiment, the transform encoded data string is generated according to the JPEG lossy mode compression standard. During decompression, each tile in the digital image is reconstructed, pixel by pixel. The background pixels are reconstructed for each tile by reading the tiles associated merge pane data string so as to obtain the spatial locations of each background pixel and by assuming each background pixel is white. The color (or gray-scale level) for the rest of the pixels in the tile are obtained from the tile generated by decompressing the transform encoded data string.

Turning to FIG. 1, the operation of Compression Apparatus 12 will now be described with reference to its operation in compressing Digital Image A to create a compressed merge plane and transform encoded data. It is first noted that Digital Image A is a 24-bit color digital image expressed in an RGB coordinate system. Digital Image A includes a white background and text set against the white background.

As shown, Compression Apparatus 12 includes Decomposer 11, Transform Encoder Unit 22 and Merge Plane Compressor 18. In general, Decomposer 11 is adapted to receive Digital Image A via Input 13 and to identify from the digital image a set of 8×8 tiles, each tile being defined by three (i.e., one block for each of the three image planes) associated 8×8 blocks suitable for JPEG lossy mode compression.

For each tile identified, Decomposer 11 operates upon the tile to generate an associated compressed merge plane data string and an associated transform encoded data string. This is accomplished by Decomposer 11 first characterizing the tile as falling into one of three categories. For convenience these categories are referred to as "category 1", "category 2" and "category 3". A tile is determined to be a "category 1" tile if the tile is a monotone tile comprised of white pixel. A tile is determined to be a "category 2" tile if the tile is a binary tile comprised of white pixels. A tile is determined to be a "category 3 tile" if the tile does not fall within the first two categories.

As previously mentioned, a merge plane indicates the spatial location of each background pixel in the digital image. Also previously mentioned, the merge plane generated by Decomposer 11 is comprised of a series of merge plane data strings, one for each tile. In this embodiment, each data string is 64 bits in length. Each bit corresponding (by its order in the data string) to a unique pixel in the associated tile. If a bit is set, this indicates the corresponding pixel is a background pixel. If a bit is not set, this indicates the corresponding pixel is not a background pixel.

Therefore, if the tile is determined by Decomposer 11 to be a category 1 tile, Decomposer 11 responds to this condition by generating a merge plane data string for the tile consisting of 64 set bits. Decomposer 11 then transmits the string to Merge Plane Compressor 18. In general, Merge Plane Compressor 18 responds to a merge plane data string by using a lossless compression procedure to compress the data. Although any lossless compression procedure could be used, in this embodiment Merge Plane Compressor 18 makes use of the LZW data compression technique to compress each received merge plane data string. After a merge plane data string is compressed, Merge Plane Compressor 18 appropriately stores the compressed data in Memory Device 24 so as to build a Merge Plane for Digital Image A.

In addition, if Decomposer 11 determines that the current tile is a category 1 tile, Decomposer 11 also transmits a first signal to Transform Encoder Unit 22. This first signal informs Transform Encoder Unit 22 that the current tile is a category 1 tile. Transform Encoder Unit 22 responds to this condition by generating an arbitrary data string and to store the data string appropriately in Memory Device 24. The encoded data string is of a length so as to provide a place holder for the associated tile in the Transform encoded Data. This is required only because during decompression, the decompression device expects to find a transform encoded data string for each tile in the digital image. Because the pixels for a tile categorized as a Category 1 tile are all background pixels and will be reconstructed from the associated merge plane data string during decompression, the actual value for the transform encoded data string is irrelevant. Of course, in other embodiments, a transform encoded data string need not be generated at all for this type of tile.

If, however, the current tile is determined to be a category 2 tile, Decomposer 11 responds to this condition by generating a merge plane data string that consists of a set bit for each background pixel and an un-set bit for each non-background pixel in the tile. The merge plane data string is then transmitted to Merge Plane Compressor 18 for compression and storage in the same manner described above. In addition, Decomposer 11 also transmits a second signal to Transform Encoder Unit 22 and data that indicates the color (in an RGB color coordinate system) of the non-background pixels present in the current tile.

Transform Encoder Unit 22 responds to this second signal and color data by generating a transform encoded data string (in accordance with the JPEG lossy mode compression standard) that is representative of a monotone tile comprising only the uniformly colored non-background pixels. As understood by a person skilled in the art, the generation of this transform encoded data string is a relatively simple procedure. First the single non-background color is converted from an RGB color coordinate space to Luminescence (Y) and red-yellow (Cr) and blue-yellow (Cb) chrominance components. The DCT Coefficients for the representative monotone tile is then generated from these YCrCb components. As can be seen by a person skilled in the art, this results in only three DCT coefficients having to be determined. This is because the DCT for a monotone tile generates only a DC coefficient for each image plane (i.e., all the rest of the coefficients go to zero). Once the three DC coefficients are generated, Transform Encoder Unit 22 then quantizes each coefficient using standard Quantization tables. The resulting quantized data is then Huffman encoded using standard Huffman tables to create the transform encoded data string for the category 2 tile. It is noted that the Huffman encoding is a relatively simple operation because it is known that the quantized data for a monotone tile consists only of the quantized DC coefficients (the rest of the coefficients are known to be zero). This saves Transform Encoder Unit 22 from having to search through the quantized data for any other non-zero coefficients.

If the current tile is determined by Decomposer 11 to be a category 3 tile, Decomposer 11 responds to the condition by generating a merge plane data string consisting of 64 un-set bits, as previously described above. Decomposer 11 then transmits the string to Merge Plane Compressor 18 for compression and storage in the same manner as described above. In addition, Decomposer 11 transmits the entire tile to Transform Encoder Unit 22 where it is then converted to a transform encoded data string using standard techniques for JPEG lossy mode compression. Thus, the tile is converted from the RGB color coordinate system to a YCrCb color coordinate system. The resulting color space converted tile is then converted into the frequency domain by calculating (for each image plane) all the coefficients for the DCT. The coefficients are then quantized and Huffman encoded to generate the transform encoded data string for the category 3 tile.

It can be seen that the system overhead associated with Compression Apparatus 12 compressing Digital Image A can be much less as compared to prior art compression apparatus. This is especially true if Digital Image A comprises a significant number of tiles that are characterized as category 1 tiles or category 2 tiles. This is because the category 1 tiles need not be transform encoded at all. In addition, the category 2 tiles can be transformed coded as if the tile were a monotone tile. In addition, it can be seen that the compression ratios that can be achieved do not result in significant degradation in image quality for these tiles. In part, this is because the background pixels are retrieved from the lossless compressed merge plane data. In addition, the color of the non-background pixels present in the category 2 tiles can be very accurately represented in the transformed coded data.

One important use of the present invention is to compress digital images prior to transmitting the digital image to a printer for printing. Many laser printers are configured to receive data from a host computer in a control language format. A widely used control language is called "printer control language" (PCL). When operating in a PCL environment, a host computer configures a data stream to include both print function commands and interspersed print data. The printer converts the received data stream into a list of simple commands, called display commands, which define what must be printed. The printer then processes the display commands and renders the described objects into a digital image suitable for printing. This type of digital image is commonly referred to as a raster bit map. In general, only a small proportion of the printer's available memory is allocated to store the print function commands and interspersed data, with the majority of the print buffer area being given over to support of processing functions and the resultant raster bit map image. Other printer systems employ a procedure wherein the host computer rasterizes image data and sends it to the printer in the rasterized form. This enables the use of a host computer's processor, which typically has greater capability than the printer processor to accomplish the rasterization of the image. The host computer, after the rasterization has been performed, then transfers the rasterized data in to the printer. Sometimes the rasterized data is first compressed before transmitting the data to the printer in order to reduce the time and computing resources required to transmit the rasterized data in addition to reducing the required amount of printer memory required to receive the digital image. In this case, the printer includes decompression capability that is used to decompress the rasterized data. After decompression, the rasterized data can then be transmitted to the printer's video buffer for printing. For examples of such systems see, U.S. Pat. No. 5,490,237 entitled: "Page Printer Having Improved System For Receiving And Printing Raster Pixel Image Data From A Host Computer". Also see U.S. Pat. No. 5,706,410 entitled: "Printing System Having Control Language Command And Raster Pixel Image Data Processing Capability". Both of these patents are incorporated herein by reference.

Figure 2:
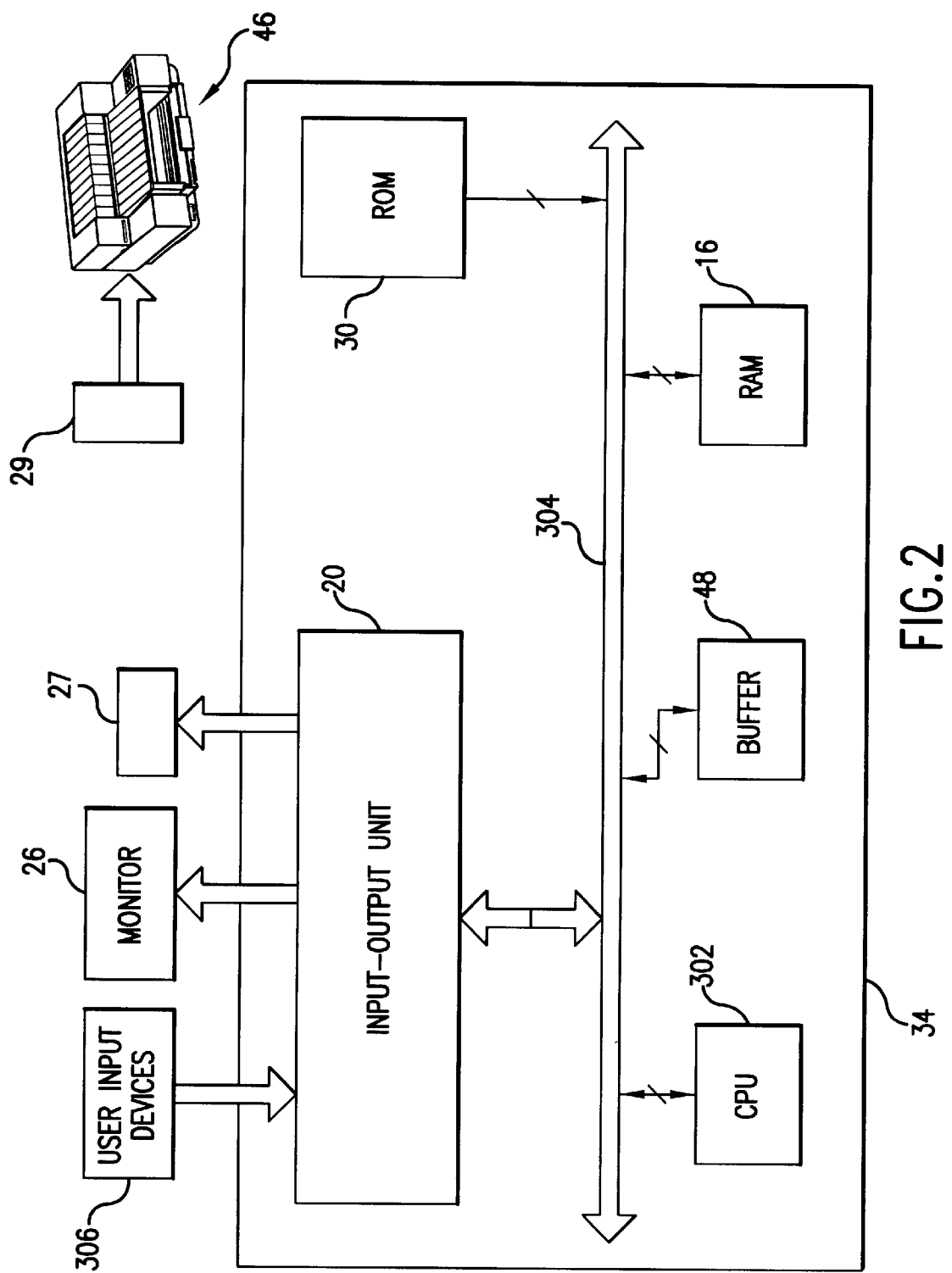
FIG. 2 depicts a second embodiment of the present invention in the form of a computer.

The present invention can be used to improve the capability of computer systems to compress rasterized images for transmission to a printer. To illustrate this, FIG. 2 depicts a second embodiment of the present invention in the form of Computer 34. In this embodiment, Computer 34 is assumed to be a personal computer. As shown, the major subsystems of Computer 34 include an Input-Output Unit 20, Central Processing Unit (CPU) 302, Random Access Memory (RAM) 16, Buffer 48 and Read Only Memory (ROM) 30 all interconnected via Internal Bus 304.

It is assumed that Computer 34 can also run an application software that allows a user (via interaction with User Input Devices 306) to create digital images for display onto monitor 26. In this embodiment, it will be assumed that application software 36 produces 24-bit color digital images in an RGB color coordinate system. Typically, the digital images generated by Application software have white backgrounds and text characters that are uniform in color.

After the creation of a digital image by the use of application software, the user can make use of a print driver to convert the digital image (using well known techniques) into a rasterized form suitable to be received into the video buffer of Laser Printer 46.

After the digital image is converted into a rasterized form, the user can choose to invoke compression software in order to compress the rasterized data before transmitting the data to Printer 46. As explained in greater detail below, the compression software converts the rasterized data into a compressed form by creating a compressed merge plane and transform encoded data. The transform encoded data is generated in accordance with the JPEG lossy mode compressed standard. It is noted that during decompression the rasterized data is reconstructed tile by tile from the merge plane and transform encoded data in a similar manner as described in the first embodiment.

Figure 3:
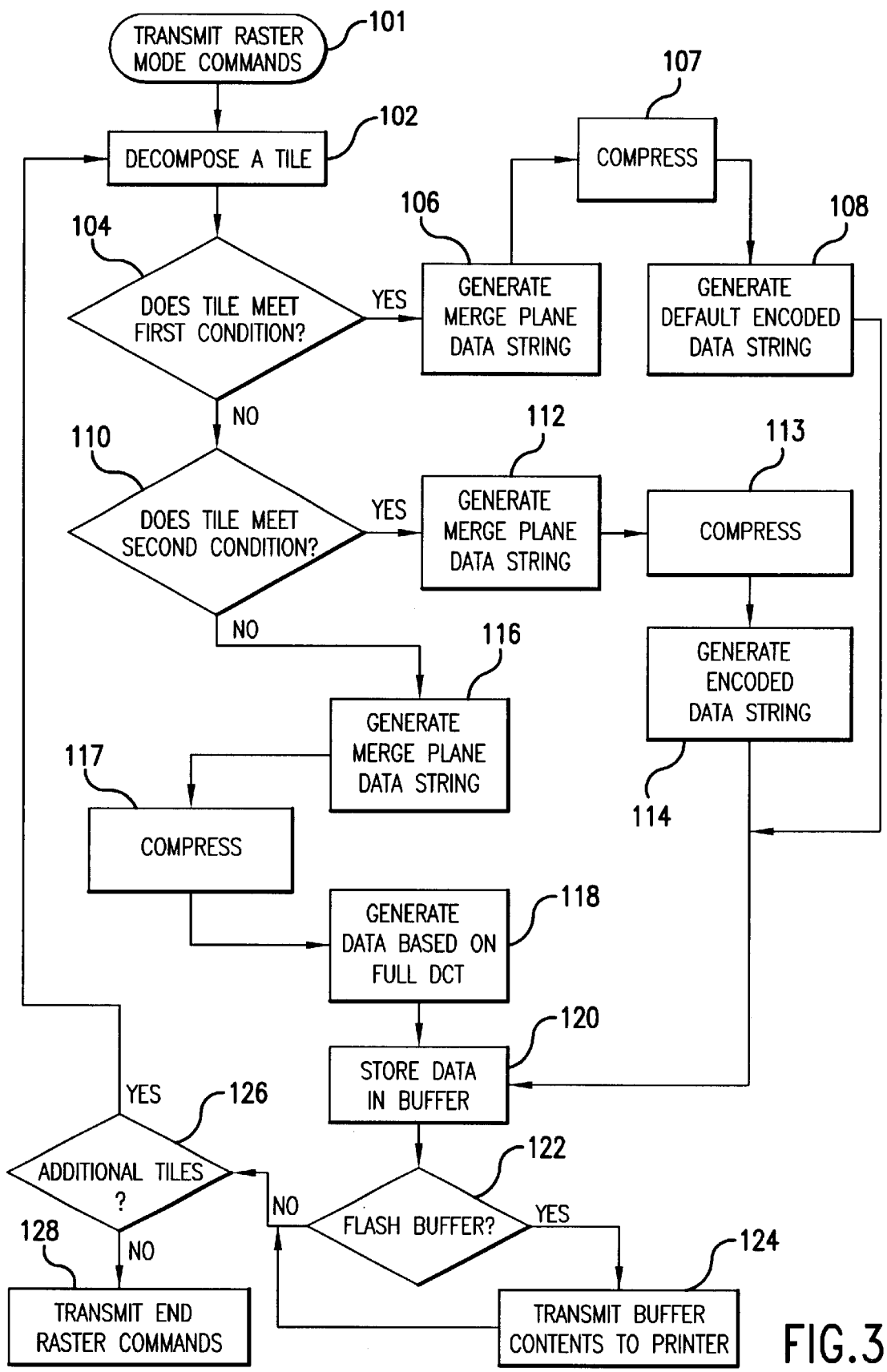
FIG. 3 depicts a flow diagram to illustrate the second embodiment of the present invention.

In order to explain further the operation of CPU 302 under the direction of the compression software to compress the rasterized data, reference is made to the logic flow diagrams depicted in FIG. 3. First, CPU 302 operates to transmits control commands over a communication link (not shown) connecting Computer 34 to Printer 46 via connection 27 and connection 29 (box 101). These control commands are used to place Printer 46 in a proper state to receive the compressed raster data. In this embodiment, these commands are expressed in PCL. It is noted, however, that in other embodiments other printer control languages could be used.

Before discussing the rest of the operation of CPU 302, it is first noted that in the present embodiment, both Printer 46 and Computer 34 are pre-configured to a default condition. While in this condition, all background pixels are assumed to have a color of white. This could be accomplished in a number of ways. For example, the application software or the print driver could direct CPU 302 to operate under this default condition and direct CPU 302 to transmit a control command to Printer 46 so as to direct Printer 46 to also operate under this default condition. In this embodiment, however, the compression software directs CPU 302 to operate under this default condition and Printer 46 is pre-configured to also operate under the default condition.

Referring still to FIG. 2, after the control commands are transmitted to Printer 46, CPU 302 then operates to decompose a tile from the rasterized image (box 102) and to then convert the tile into a compressed merge plane data string and a transform encoded data string. For each tile, this is accomplished by first determining whether the tile meets a first condition (decision box 104). A tile meets the first condition if the tile is a monotone tile comprising background pixels. Because the background pixels are all assumed to be white, this means that the tile must consist only of white pixels to meet this first condition.

If the tile is determined to meet the first condition, a merge plane string is generated (box 106). As previously mentioned, because all background pixels are assumed to be white, the merge plane data string can be a relatively small amount of data. In this embodiment, the merge plane data string consists of a sequence of bits, each bit corresponding to a unique pixel in the tile. If a bit for a corresponding pixel is not set, this indicates the corresponding pixel is a background pixel. After the merge plane data string is generated, it is then compressed (box 107) using a lossless compression technique. It is noted that because all the pixels in a tile determined to meet the first condition are defined in the merge plane, the tile need not be transform encoded. In this embodiment, however, it is assumed that during decompression it is expected that there will always be a transform encoded data string for each tile in the compressed image. For this reason, CPU 302 generates an arbitrary string of bits, with the only requirement that the string have a length that is equivalent to the length of a tile after being transform encoded (box 108). The two strings are then stored in Buffer 48 (box 120).

If the tile is determined not to meet the first condition, a determination is then made as to whether the tile meets a second condition (decision box 110). For a tile to meet the second condition, the tile must be a binary tile that has at least one background pixel. Because all background pixels are assumed to be white, a tile is determined to meet this second condition if it consists of pixels that are all white and one other color. For example, a tile that consists of white pixels and green pixels would be determined to meet the second condition. If the tile is determined to meet the second condition, a merge plane data string is generated (box 112) that indicates the spatial location of all the background pixels in the tile. As previously indicated, in this embodiment, this is accomplished by generating an ordered sequence of bits, each bit in the sequence corresponding to the spatial location of a particular pixel in the tile. If a bit is set, this indicates that the corresponding pixel is not a background pixel. If, however, the bit is not set, this indicates the corresponding pixel is a background pixel. After the merge plane data string is generated it is then compressed (box 113) using a lossless compression technique.

After the merge plane data string is generated, the tile is then transform encoded (box 114) by generating a transform encoded data string that is representative of a monotone tile consisting of pixels that all have the non-background color. This is accomplished in accordance with the JPEG lossy mode compression standard. As previously shown this is accomplished in a simple manner as a monotone tile has only a single spatial frequency that needs to be represented in the frequency domain. CPU 302 first performs a color space conversion and then determines a single DC coefficient for each of the image planes in the tile. Each DC coefficient is then quantized and Huffman encoded to create the transform encoded data string. It is noted that the Huffman encoding is performed with it being known that only the first quantized coefficient is non-zero. As previously mentioned, this simplifies the Huffman encoding procedure. After the two data strings for the binary tile are generated, the strings are then stored into Buffer 48.

If the tile is determined not to be a monotone tile or a binary tile, a merge plane data string is generated indicating that there are no background pixels in the digital image (box 116). After the merge plane data string is generated, it is then compressed (box 117) using a lossless compression technique. After the merge plane data string is generated, CPU 302 operates to transform encode the tile (box 118) by using standard JPEG compression techniques and Huffman encoding.

As depicted in FIG. 3, after the merge plane data string and encoded data string for the tile is generated, a determination is then made as to whether to flush Buffer 48 (decision box 122). In this embodiment, this is done after a pre-determined number of merge plane data strings and encoded data strings (representative of a certain number of tiles) have been stored into Buffer 48. Thus, if CPU 302 determines that Buffer 48 has the pre-determined number of merge plane data strings and encoded data strings, CPU 302 then flushes Buffer 48 by transmitting the contents of Buffer 48 in an appropriate manner, to Printer 46. Printer 46 can then operate to receive this data into its own buffer memory. At this point, Printer 46 can begin decompressing the data to reconstruct the compressed raster image for direct input into the printers video buffer.

After CPU 302 (if necessary) has flushed Buffer 48, CPU 302 then determines whether additional tiles from the digital image are required to be encoded (Decision box 126). If so then CPU 302 performs the same operations described above to the next tile. If there are no additional tile to be encoded, CPU 302 then transmits an appropriate command to Printer 46 to inform Printer 46 that all the compressed data has been transmitted. (box 128) It is again noted that during decompression, Printer 46 reconstructs the raster image by first decompressing and reading each tiles associated merge plane data string. If the merge plane data string indicates that the tile has background pixels, those pixels are given a color of white. The rest of the pixels are reconstructed by decompressing the tiles associated transform encoded data string to obtain a representative tile. The color of each non-background pixel is then obtained from this representative tile.

Figure 4:
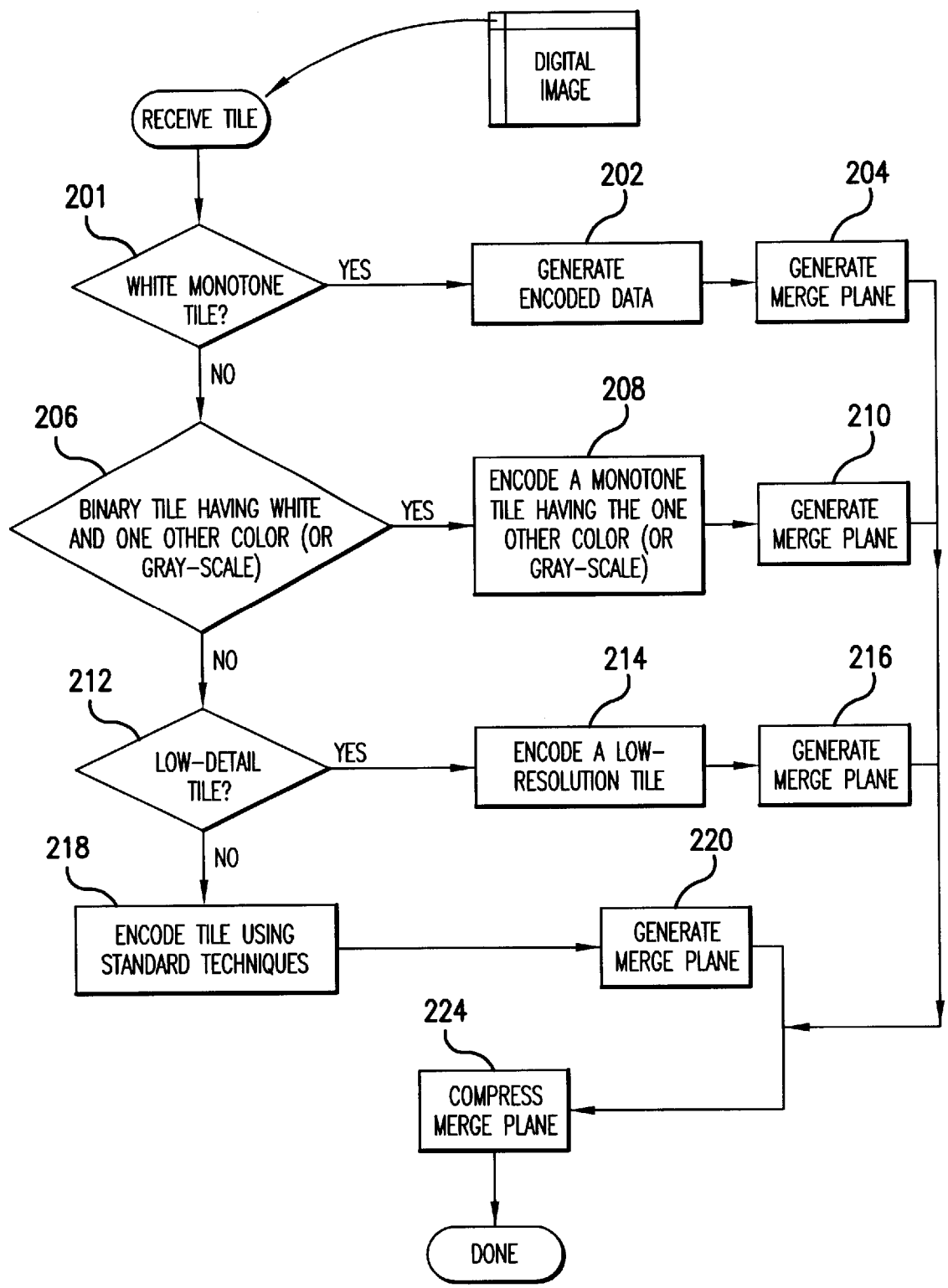
FIG. 4 depicts a flow diagram of a third embodiment of the present invention.

One advantage of the present invention is that it can easily be integrated with other compression techniques so as to further optimize the encoding of a digital image. To illustrate this, yet another embodiment of the present invention is depicted in FIG. 4. In this embodiment, the present invention is used along with the compression technique (referred to herein as the "low-detail compression technique") described in the co-pending application Ser. No. 09/181,066 entitled: "System For Compression Of Digital Images Compressing Low Detail Areas", and also the technique (hereinafter referred to as Huffman data compression technique) described in the co-pending application Ser. No. 09/179,925 entitled: "Apparatus And Method For Compressing Huffman Encoded Data".

In this embodiment, the digital image being compressed is again assumed to have a white background. In addition, the background pixel data generated for each tile from the digital image is a merge plane data string. The transform encoded data is generated in accordance with the JPEG compression standard and using Huffman encoding.

As previously discussed, the merge plane data string indicates the spatial location of each background pixel for its associated tile. In this embodiment, it is also assumed that during reconstruction of the digital image, the decompression apparatus reads each merge plane data string to determine the location of the background pixels in the digital image. In addition, the decompression apparatus is preconfigured to define each background pixel identified from the merge plane data as white. The rest of the pixels in the digital image are reconstructed from the transform encoded data.

Referring now to FIG. 4, for each tile decomposed from a color digital image, a determination is first made as to whether the tile (herein referred to as the "current tile") is a monotone tile comprised of white pixels (decision box 201). If so, an arbitrary encoded data string is generated (box 202) and a merge plane data is also generated for the current tile (box 204). The merge plane data string generated indicates all the pixels in the current tile are background pixels. As previously mentioned, the encoded data string for a monotone tile can be arbitrary, or in other embodiments need not be generated at all, because the background pixels are reconstructed from the merge plane data. After the merge plane data is generated, it is then compressed (box 204) using a lossless compression technique. In this embodiment, the LZW compression technique is used to compress the merge plane data. It is noted, however, that other lossless compression techniques could be used in other embodiments (e.g., compression could be accomplished in accordance with the JBIG compression standard).

If the current tile is determined not to be a monotone tile comprised of white pixels (decision box 201), a determination is then made (decision box 206) as to whether the current tile is a Binary tile that has pixels that are white and one other color (or gray scale level). If so, then a transform encoded data string is generated that is representative of a monotone tile defined by pixels that are all the non-white color in the current tile. After the encoded data string is generated, the merge plane data string for the current tile is generated (box 210) and compressed (box 224).

If the current tile is determined not to be a Binary Tile having pixels that are white and one other color (or gray scale level) from decision box 206, then a determination is made as to whether the current tile can be transform encoded using the low-detail compression technique mentioned above (decision box 212). In this embodiment, this is accomplished by determining whether the current tile can be adequately represented by a tile that has only four pixel values (referred to in general as a "four-value tile").

Figure 5:
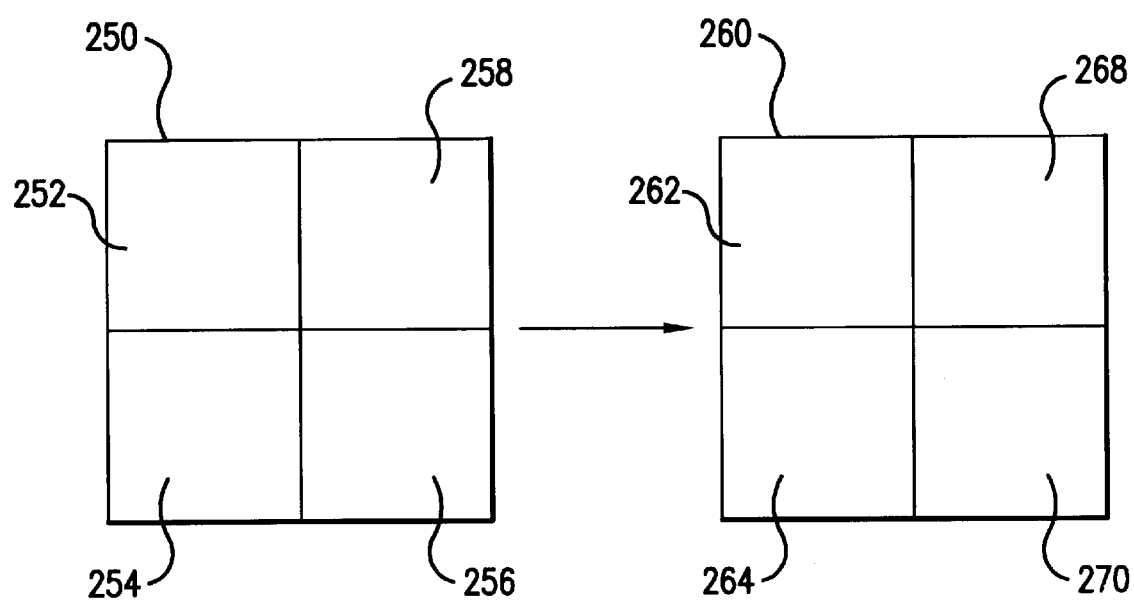
FIG. 5 depicts two JPEG tiles.

So, for example, assumes Tile 250 depicted in FIG. 5 is the current tile under consideration. As depicted, Tile 250 can be broken into four, 4×4 pixel arrays. These arrays are represented in FIG. 5 as First Array 252, Second Array 258, Third Array 254 and Fourth Array 256. A determination is then made as to whether this tile can be represented by Tile 260. Tile 260 can also be broken into four 4×4 pixel arrays. All the pixels in First Array 262, are all one value. This one value is the average of the pixel values in First Array 252. Likewise, all the pixels in Second Array 268, are all a second value. This second value is the average of the pixel values in Second Array 258; all the pixels in Third Array 264, are all a third value. This third value is the average of the pixel values in Third Array 254. Finally, the fourth value is are all a fourth value. This fourth value is the average of the pixel values in Fourth Array 256 of Tile 260.

Referring again to FIG. 4, if the current tile is determined to be adequately represented by a four-value tile, then the transform encoded data is generated that is representative of the four value tile (box 214) in addition the merge plane data string is generated (box 216). The merge plane data indicates that the current tile does not have any background pixels. The merge plane data string is then compressed (box 216).

Finally, if the current tile is determined not to be a low-detail tile (decision step 218) then the tile is encoded using standard techniques (box 218). In addition, a merge plane data string is generated that indicates that the current tile does not have any background pixels (box 220). The merge plane data is then compressed (box 216). It is noted in other embodiments, after the Huffman encoded data for each tile is generated, the data can be further compressed by using the Huffman data compression technique described in the application mentioned above entitled: "Apparatus And Method For Compressing Huffman Encoded Data".

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A computing system, comprising:
   (a) a computer enabled to convert a binary tile into a set of data that includes lossy compressed data and lossless compressed data; and
   (b) a printer, connected to the computer, enabled to reconstruct the binary tile from the set of data; and
   wherein the binary tile includes pixels having a background value and one other value;
   wherein the lossy compressed data describes a monotone tile comprised of pixels having the one other value;
   wherein the lossless compressed data indicates the spatial location of each background pixel and the spatial location of each one other value pixel in the binary tile; and
   wherein the set of data does not indicate the background pixel value.

2. The computing system of claim 1, wherein the background value corresponds to white and the one other value corresponds to black.

3. The computing system of claim 1, wherein only the lossy compressed data portion of the set of data describes the one other value.

4. The computing system of claim 1, wherein the printer is enabled to reconstruct the binary tile from the set of data, in part, by generating a pixel having a default value at each background pixel location indicated by the lossless compressed data.

5. The computing system of claim 1, wherein the printer is enabled to reconstruct the background pixels by generating a pixel having a default value at each background pixel location indicated by the lossless compressed data; and
   wherein the printer is enabled to process the lossy compressed data to identify the value of the monotone tile pixels; and
   wherein the printer is enabled to reconstruct the one other value pixels by generating a pixel, having the value of the monotone tile pixels, at each one other value pixel location indicated by the lossless compressed data.

6. The computing system of claim 5, wherein the default value is white.

7. The computing system of claim 6, wherein the printer is further enabled to print the reconstructed binary tile.

8. A method, comprising:
   (a) decomposing a digital image into a set of tiles;
   (b) identifying, from the set of tiles, a binary tile that includes pixels having a background value and one other value;
   (c) converting the binary tile into a set of data that includes lossy compressed data and lossless compressed data;
   (d) transmitting the set of data to a printer capable of reconstructing the binary tile from the set of data; and
   wherein the lossy compressed data describes a monotone tile of pixels each having the one other value;

wherein the lossless compressed data indicates the spatial location of each background pixel in the binary tile; and wherein the set of data does not indicate the value of the background pixels.

9. The method of claim 8, further comprising:

(e) identifying, by the printer, the location of each background pixel in the binary tile from the lossless compressed data; and (f) generating a pixel having a default value at each pixel location identified at step (e).

10. The method of claim 9, further comprising:

(g) identifying, by the printer, the value of the monotone tile pixels from the lossy compressed data;

(h) generating a pixel having the value identified at step (g) at each pixel location in the binary tile not identified at step (e).

11. A computer, comprising:

(a) means for converting a binary tile consisting of white and black pixels into a set of data that includes lossy compressed data and lossless compressed data;

(b) means for transmitting the set of data to a second device capable of reconstructing the binary tile from the lossy and lossless compressed data; and wherein the lossy compressed data describes a monotone tile consisting of black pixels; and wherein the lossless compressed data indicates the spatial location of each white pixel;

wherein the set of data does not Indicate that the white pixels are white.

12. The computer of claim 11, wherein the lossy compressed data is JPEG compressed data.

13. The computer of claim 11, wherein the lossy compressed date represents the monotone tile after being converted to the frequency domain.

14. The computer of claim 11, wherein the second device is a printing device.

* * * * *